Jan. 8, 1963 A. L. SHOOK 3,072,307
STRINGERS FOR GAME FISH AND BIRDS
Filed Feb. 17, 1961 2 Sheets-Sheet 1
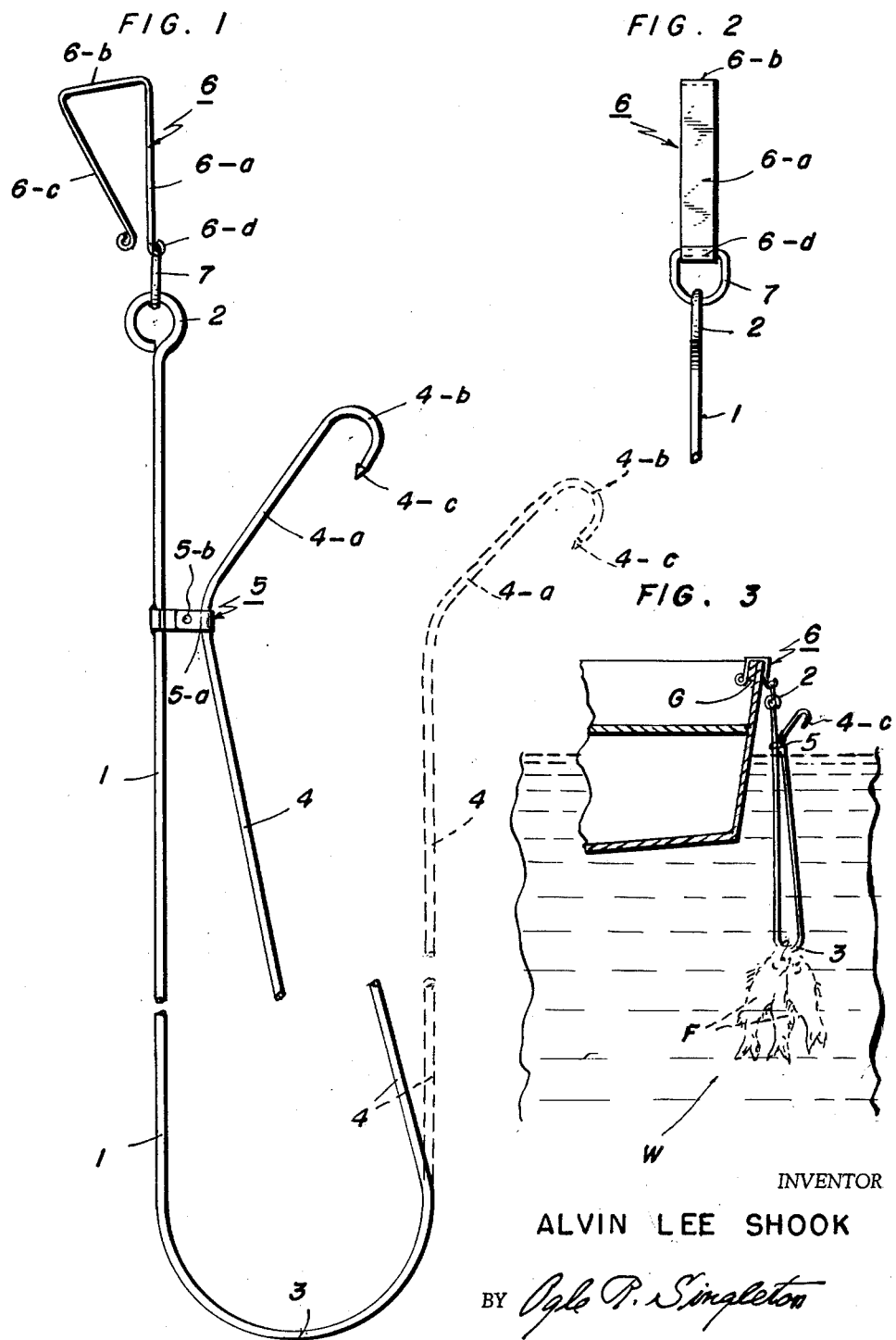
INVENTOR
ALVIN LEE SHOOK
BY Ogle P. Singleton
ATTORNEY Jan. 8, 1963  A. L. SHOOK  3,072,307
STRINGERS FOR GAME FISH AND BIRDS
Filed Feb. 17, 1961  2 Sheets-Sheet 2

INVENTOR
ALVIN LEE SHOOK
BY Ogle R. Singleton
ATTORNEY

United States Patent Office 3,072,307
Patented Jan. 8, 1963

3,072,307
STRINGERS FOR GAME FISH AND BIRDS
Alvin Lee Shook, Box 112, Pottsboro,
Grayson County, Tex.
Filed Feb. 17, 1961, Ser. No. 90,055
1 Claim. (Cl. 224—7)

My invention consists in a new and useful improvement in stringers for game fish and birds, and is designed to provide means for a fisherman or a hunter to string his quarry on a carrying means which can be mounted either on a boat used for fishing or on a hunter's belt. The peculiarly novel and useful feature of my device is the fact that the structure is such that the stringing of the quarry, either fish or birds, can be accomplished by the use of only one hand of the user.

My device is of sturdy construction, and will carry extremely heavy loads of game. It can be loaded and emptied very easily, as the catch can be poured off of the device onto a dressing table, into a bucket or basket, or into the bottom of a boat.

While I illustrate in the drawings and hereinafter fully describe specific embodiments of my invention, it is to be understood that I do not consider my invention to be limited to said embodiments, but refer for its scope to the claim appended hereto.

In the drawings:

FIG. 1 is a side elevation of my device, parts being broken away.

FIG. 2 is a fragmentary front elevation.

FIG. 3 is a view showing the device mounted on the gunwale of a boat and holding fish in the water.

Figure 6:
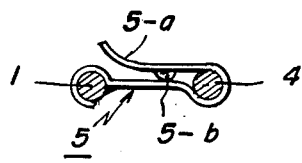
FIG. 6 is a horizontal section on the line 6—6 of FIG. 4, in the direction of the arrows.

As shown in FIGS. 1, 2 and 3, my device has a straight shaft 1 with a closed ring 2 at one end and a substantially semi-circular bend 3 at the other end, and a flexible shaft 4 extending from the bend 3. The shaft 4 has an outwardly turned portion 4-a with a substantially semi-circular bend 4-b with a tapered end 4-c. A catch 5 is suitably attached to the shaft 1, as by welding, and has a resilient keeper 5-a with an up-set knob 5-b (FIGS. 1 and 6). I provide a clamp 6 for removably attaching the device to the boat gunwale G (FIG. 3). The clamp 6 has a portion 6-a with a right-angle extension 6-b carrying a resilient finger 6-c adapted to grip the gunwale G. The portion 6-a has a socket 6-d in which is mounted a D-ring 7 loosely engaging the ring 2.

Figure 4:
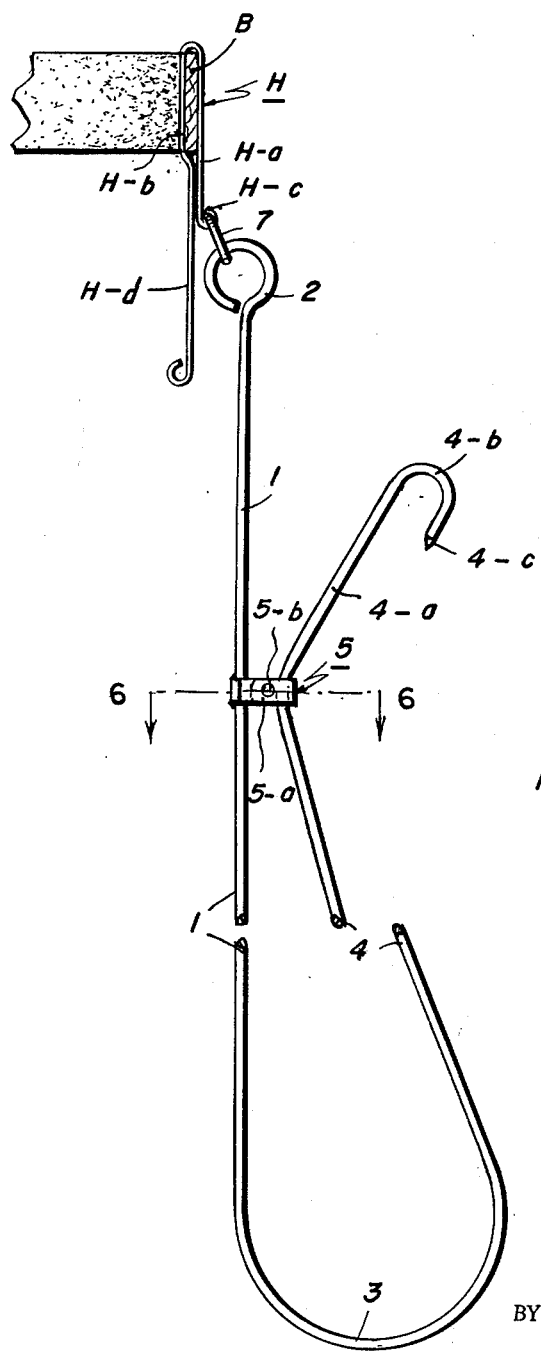
FIG. 4 is a side elevation of another form of my device, parts being broken away.
Figure 5:
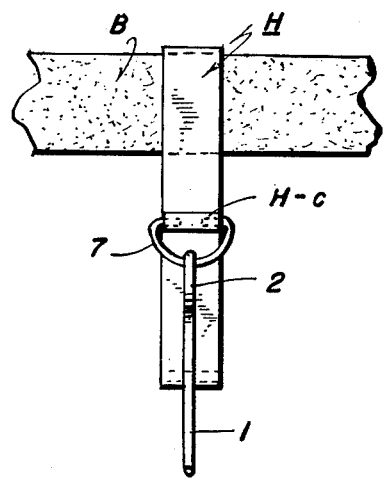
FIG. 5 is a fragmentary front elevation of the device of FIG. 4.

The form of my device shown in FIGS. 4, 5 and 6 varies from the form of FIGS. 1, 2 and 3 only in the supporting means for the device.

This form has a hanger H having a pair of spaced resilient portions H-a and H-b adapted to receive therebetween and clamp the belt B of the user of the device. The portion H-a has a socket H-c in which is mounted the D-ring 7 engaging the ring 2 of the shaft 1. The portion H-b has a handle H-d projecting downwardly therefrom for engaging the hanger H to the belt B and disengaging it therefrom.

Having described the details of construction of my device, I will now describe its use.

When clamp 6 has been attached to the gunwale G, or the hanger H has been clamped to the belt B, the device hangs against the side of the boat (FIG. 3) or by the upper leg part. When a piece of game is to be strung on the device, it is pressed against the tapered end 4-c, being impaled thereby. The pressure causes the portion 4-a to be released from the catch 5 and assume the position shown in broken lines in FIG. 1. The piece is dropped, to slide along portions 4-a and 4 to rest in bend 3, and the portion 4-a is re-inserted in catch 5.

It will be noted that the shaft 4 is circular in cross-section and that the knob 5-b of the catch 5 has a conical surface (FIG. 6), so that when the shaft 4 is pressed against the knob 5-b only these two curved surfaces contact to facilitate opening and closing of the catch 5.

Attention is especially directed to the fact that, owing to the novel structure and combination of the parts of the device, all of the steps of the above-described operation are performed by only one hand of the user, a peculiarly valuable feature of the device, leaving the other hand of the user free to hold either a fishing rod or line or a hunting gun.

It will be noted (FIG. 3) that when the device is used with a boat, the string of fish F is disposed in the water W in fixed relation to the boat, thereby preventing fouling the propeller of the boat.

Having described my invention, what I claim is:

In a stringer for fish, attachable to a boat gunwale, the combination of a resilient clamp comprising a first plate to engage the outboard side of the gunwale, a second plate normal to said first plate to engage the upper edge of the gunwale, a plate affixed at an acute angle to said second plate, to engage the inboard side of the gunwale, and a socket on the free end of said first plate; a first closed ring mounted in said socket; a rod so configured as to provide a second closed ring, said second closed ring being engaged in said first ring in said socket, a straight portion extending from said second closed ring, a resilient bend extending outwardly from said portion, a second straight portion extending upwardly from said bend, said bend normally biasing said second straight portion from said first straight portion, a third straight portion angularly extending outwardly from said second straight portion, a second bend extending downwardly from said third straight portion, and having a tapered end; and a catch mounted on said first straight portion of said rod and having a resilient keeper engaging the outer end of said second straight portion when the resilient bend is distorted to juxtapose said first and said second straight portions.

References Cited in the file of this patent

UNITED STATES PATENTS

| | | |
|---|---|---|
| 1,077,099 | Shafer | Oct. 28, 1913 |
| 1,350,390 | Stein | Aug. 24, 1920 |
| 2,437,331 | Murray et al. | Mar. 9, 1948 |
| 2,592,389 | Budy | Apr. 8, 1952 |
| 2,788,164 | Gibney | Apr. 9, 1957 |